United States Patent
Cho

(10) Patent No.: US 8,639,789 B2
(45) Date of Patent: Jan. 28, 2014

(54) METHOD AND APPARATUS FOR GENERATING TASK IN NETWORK AND RECORDING MEDIUM STORING PROGRAM FOR EXECUTING THE METHOD

(75) Inventor: Jung-Yon Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 622 days.

(21) Appl. No.: 12/278,115

(22) PCT Filed: Nov. 11, 2006

(86) PCT No.: PCT/KR2006/004624
§ 371 (c)(1),
(2), (4) Date: Aug. 1, 2008

(87) PCT Pub. No.: WO2007/089067
PCT Pub. Date: Aug. 9, 2007

(65) Prior Publication Data
US 2009/0024731 A1  Jan. 22, 2009

(30) Foreign Application Priority Data
Feb. 3, 2006 (KR) .................. 10-2006-0010611

(51) Int. Cl.
G06F 15/173 (2006.01)
H04N 7/16 (2011.01)
G06F 15/00 (2006.01)
G06F 12/00 (2006.01)

(52) U.S. Cl.
USPC ............. 709/223; 725/62; 358/1.15; 707/899

(58) Field of Classification Search
USPC ............. 709/217–229; 358/1.15; 707/2, 100; 725/62
See application file for complete search history.

(56) References Cited

U.S. PATENT DOCUMENTS 5,113,393 A    5/1992 Kam et al.
6,779,004 B1   8/2004 Zintel
(Continued)

FOREIGN PATENT DOCUMENTS

JP    62-046336 A    2/1987
JP    2003006070 A   1/2003

OTHER PUBLICATIONS

K. Morse, et al.: "An Architecture for Web-Services Based Interest Management in Real Time Distributed Simulation", Distributed Simulation and Real-Time Applications, 2004. DS-RT 2004. Eighth IEEE International Symposium on Budapest, Hungary, Oct. 21-23, 2004, pp. 108-115, IEEE, Piscataway, NJ, USA Oct. 21, 2004.

(Continued)

*Primary Examiner* — Ian N Moore
*Assistant Examiner* — Kiet Tang
(74) *Attorney, Agent, or Firm* — Sughrue Mion, PLLC

(57) ABSTRACT

A method and apparatus for generating a task having at least one action and/or at least one action based on previously agreed service standards to control a task-based device in a home network using universal plug and play (UPnP), and a recording medium storing a program for executing the method are provided. The method includes fetching a task generator using a device having a user interface (UI) function from among devices connected to the network; displaying a control menu including service items based on the fetched task generator using the UI function; and if a service item based on the task generator is selected from the service items included in the control menu, generating at the device the task based on the task generator.

11 Claims, 6 Drawing Sheets

(56) References Cited

U.S. PATENT DOCUMENTS

| | | | |
|---|---|---|---|
| 6,892,230 | B1 | 5/2005 | Gu et al. |
| 7,239,409 | B2* | 7/2007 | Parry .......................... 358/1.15 |
| 2002/0163534 | A1 | 11/2002 | Choi et al. |
| 2002/0171864 | A1* | 11/2002 | Sesek .......................... 358/1.15 |
| 2002/0196460 | A1 | 12/2002 | Parry |
| 2004/0146057 | A1 | 7/2004 | Yi et al. |
| 2006/0212906 | A1* | 9/2006 | Cantalini ....................... 725/62 |
| 2007/0088675 | A1* | 4/2007 | Duncan ............................. 707/2 |
| 2008/0027953 | A1* | 1/2008 | Morita et al. ................. 707/100 |

OTHER PUBLICATIONS

M. Beck, et al.: "Harness: a next generation distributed virtual machine" Future Generations Computer Systems, vol. 15, No. 5-6, Oct. 1, 1999, pp. 571-582, Elsevier Science Publishers, Amsterdam, NL.

O. Martikainen, et al.: "The OVOPS Environment for IN Applications" vol. 1 pp. 361-375, May 24, 1994.

Communication dated Mar. 7, 2013, issued by the Mexican Patent Office in counterpart Mexican Application No. MX/a/2008/009778.

Office Action, dated Aug. 31, 2012, issued by the Mexican Patent Office in counterpart Mexican Patent Application No. MX/a/2008/009778.

Communication dated Aug. 31, 2007 issued by the Korean Intellectual Property Office in counterpart Korean Patent Application No. 10-2006-0010611.

Communication dated Mar. 2, 2012 issued by the Mexican Patent Office in counterpart Mexican Patent Application No. MX/a/2008/009778.

Communication dated Aug. 21, 2013 issued by the Mexican Patent Office in counterpart Mexican Patent Application No. Mx/a/2008/009778.

* cited by examiner

FIG. 4

```
<Task Generator>
    <TaskGeneratorID>uuid of this TG</TaskGeneratorID>        // UNIQUE ID OF TG
    <DisplayMessage>DVD Disc Eject</DisplayMessage>           // SERVICE CONTENT TO BE PRESENTED TO USER VIA UI
    <TargetDevice>uuid of the DVD device</TargetDevice>       // TARGET DEVICE INFORMATION TO WHICH TG IS APPLIED
    <TaskCreationRule>
        <SubTask>
            <Order>1</Order>
            <Action>DVDEject</Action>                         // NAME OF ACTION TO BE RECOGNIZED BY TARGET DEVICE
            <TargetDevice>uuid of the DVD device</TargetDevice>   // UNIQUE ID OF TARGET DEVICE OF TASK
        </SubTask>
    </TaskCreationTemplate>
</Task Generator>
```

FIG. 5

```
<Task>
    <TaskName>uuid of this Task</TaskName>                    // unique id of Task
    <TaskCreator>uuid of device which generates Task</TaskCreator>
    <SubTask>
        <Order>1</Order>
        <Action>DVDEject</Action>
        <TargetDevice>uuid of the DVD device</TargetDevice>
        <state>READY</state>
    </SubTask>
</Task>
```

FIG. 6

```
<Task Generator>
  <TaskGeneratorID>uuid of this TG</TaskGeneratorID>
  <DisplayMessage>Store after Encoding</DisplayMessage>
  <TargetContentProfile>MPEG_PS,MPEG_TS</TargetContentProfile>
  <TaskCreationRule>
    <SubTask>
      <Order>1</Order>
      <Action>Encoding</Action>          // EXAMPLE OF NEWLY DEFINDED ACTION
      <TargetDevice>ANY</TargetDevice>   // REPRESENT THAT TARGET DEVICE
                                         //    IS NOT DEFINDED SEPARATELY
      <OutputContentURL></OutputContentURL>
    </SubTask>
    <SubTask>
      <Order>2</Order>
      <Action>Store</Action>             // EXAMPLE OF PREVIOUSLY AGREED ACTION
                                         //    BASED ON SERVICE STANDARDS
      <TargetDevice>uuid of target device</TargetDevice>
      <InputContentURI>OutputContentURI@Subtask1</InputContentURI>
    </SubTask>
  </TaskCreationRule>
</Task Generator>
```

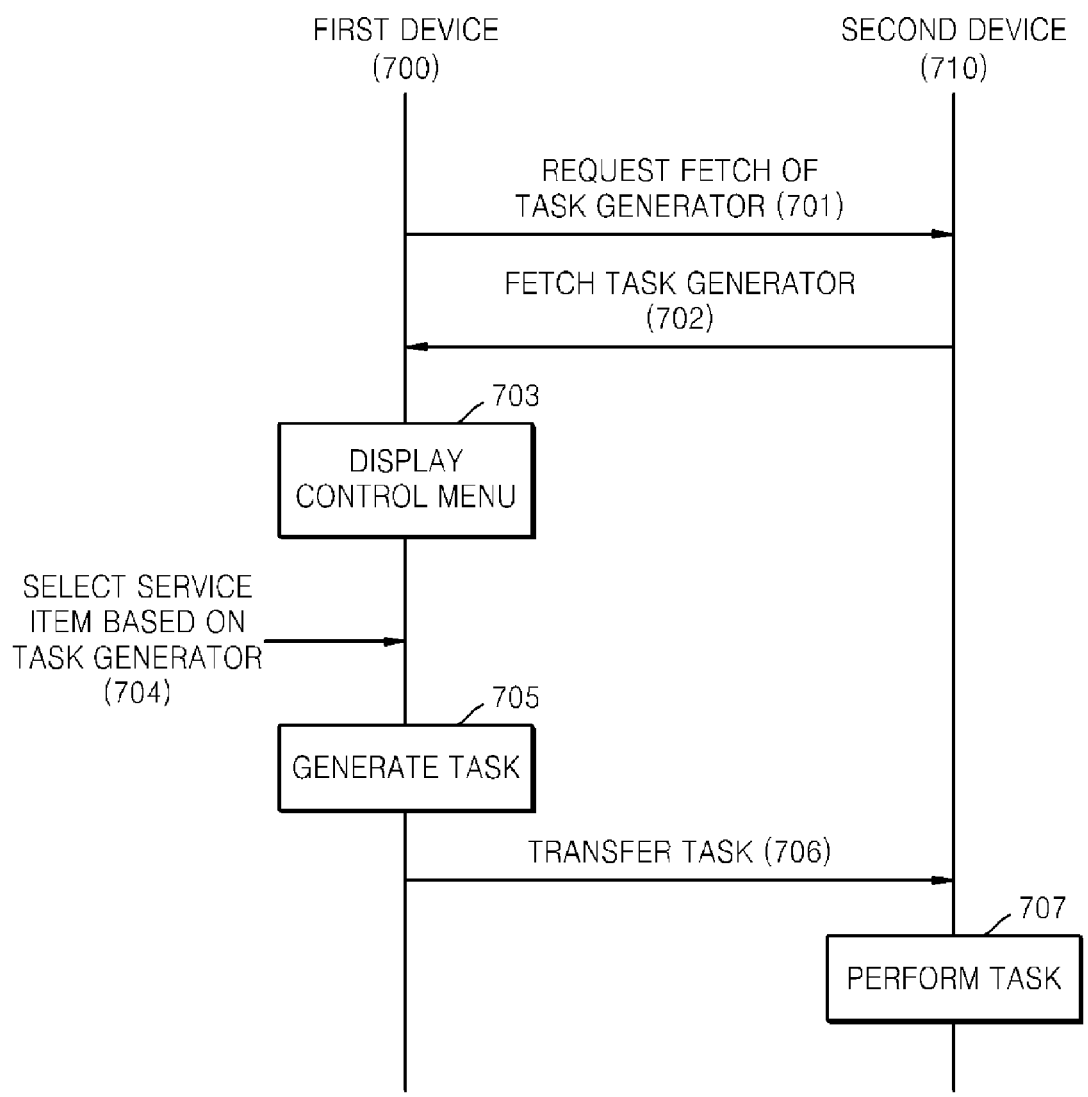

METHOD AND APPARATUS FOR GENERATING TASK IN NETWORK AND RECORDING MEDIUM STORING PROGRAM FOR EXECUTING THE METHOD

CROSS-REFERENCE TO RELATED PATENT APPLICATIONS

This application is a National Stage of International Application No. PCT/KR2006/004624 filed Nov. 7, 2006 and claims priority from Korean Patent Application No. 10-2006-0010611, filed on Feb. 3, 2006 in the Korean Intellectual Property Office, the disclosure of which is incorporated herein in its entirety by reference.

BACKGROUND OF THE INVENTION

The present invention relates to the generation of a task in a network, and more particularly, to a method and apparatus for generating a task to control a task-based device in a home network using universal plug and play (UPnP) and a recording medium storing a program for executing the method.

Device control methods in a home network using UPnP are divided into Web-based device control methods and remote procedure call (RPC)-based device control methods.

FIG. 1 is a block diagram for explaining a conventional Web-based device control method. Referring to FIG. 1, a Web server 101 included in a controlled device 100 transfers a user interface (UI) that is an action provided by the Controlled device 100 using a hypertext markup language (HTML) to a control point 110. The control point 110 renders the UI using a Web browser 111 and provides the UI to a user. The user inputs user information via the UI. The control point 110 transfers the user information to the controlled device 100.

In the conventional Web-based device control method, the action of the controlled device 100 can be freely performed since the controlled device 100 generates the UI for controlling the controlled device 100, and all actions of the controlled device 100 can be used even if the control point 110 is aware of no action of the controlled device 100, thereby being possible to control the action of new controlled devices using old control points.

However, the conventional Web-based device control method cannot provide a service automated by the control point 110 or a service supplied by devices connected to a network to the user since the user personally sees contents of the UI and selects a desired service. That is, the control point 110 cannot directly control the controlled device 100 using the conventional Web-based device control method.

Meanwhile, RPC-based device control methods control an action based on previously agreed service standards.

FIG. 2 is a block diagram for explaining a conventional RPC-based device control method. Referring to FIG. 2, a control point 200 generates a UI 201 based on service standards 220 previously agreed with a Controlled device 210 and provides the UI 201 to a user. The user selects a desired service based on the UI 201. The control point 200 generates a service request according to the service selected by the user and provides the service request to the Controlled device 210. The Controlled device 210 performs an action and returns a result obtained by performing the action based on the previously agreed service standards 220 to the control point 210.

The conventional RPC-based device control method provides a service to the user by combining actions provided from the control point 200 by the UI 201 of the control point 200 and provides a service supplied by devices connected to a network to the user by the UI 201 of the control point 200.

However, the conventional RPC-based device control method can provide the action provided by the Controlled device 210 based on the previously agreed service standards 220. To provide a new action, the conventional RPC-based device control method must define the new action according to the service standards to reflect the new action on the control point 200. Therefore, a control point operated based on old service standards cannot provide a service based on the new action.

A recently introduced task-based device control method cannot provide a service based on a new action since the method generates tasks of actions according to previously agreed service standards as in the RPC-based device control method.

SUMMARY OF THE INVENTION

The present invention provides a method and apparatus for generating a task having at least one new action and/or at least one action based on previously agreed service standards when controlling a task-based device in a home network using universal plug and play (UPnP), and a recording medium storing a program for executing the method.

When a task-based device is controlled in a home network using UPnP, the present invention fetches a task generator from a task performing device and generates a task having an action based on previously agreed service standards and/or a new action so that at least one new action excluded in the previously agreed service standards and a combination of actions based on the previously agreed service standards can be added to devices connected to the home network, thereby providing a variety of services to a user.

According to an aspect of the present invention, there is provided a method of generating a task in a network, the method comprising: fetching a task generator using a device having a user interface (UI) function among devices connected to the network; displaying a control menu including service items based on the fetched task generator using the UI function; and if a service item based on the task generator from the service items included in the control menu is selected, the device generating the task based on the task generator.

According to another aspect of the present invention, there is provided an apparatus for generating a task in a network including at least one task performing device, the apparatus comprising: a UI allowing a user to access the task generating device; a data transmitting/receiving unit transmitting/receiving data with the task performing device via the network; a controller fetching a task generator, generating the task, and transferring the task to the task performing device via the data transmitting/receiving device; and a storage unit storing the task generator.

According to another aspect of the present invention, there is provided a computer readable recording medium having embodied thereon a computer program for executing a method of generating a task in a network including at least one task generating device and at least one task performing device, the medium comprising: a code fetching a task generator using a device having a user interface (UI) function from among devices connected to the network; a code displaying a control menu including service items based on the fetched task generator using the UI function; and a code generating the task based on the task generator if a service item based on the task generator from the service items included in the control menu is selected.

BRIEF DESCRIPTION OF THE DRAWINGS

The above and other aspects and advantages of the present invention will become more apparent by describing in detail exemplary embodiments thereof with reference to the attached drawings in which:

FIG. 4 illustrates a task generator fetched from a task performing device according to an embodiment of the present invention;

FIG. 5 illustrates a task generated based on the task generator illustrated in FIG. 4;

FIG. 6 illustrates a task generator fetched from a task performing device according to another embodiment of the present invention;

FIG. 7 is a flowchart of a task generating method according to an embodiment of the present invention.

DETAILED DESCRIPTION OF EXEMPLARY EMBODIMENTS

The present invention will now be described more fully with reference to the accompanying drawings.

Figure 1:
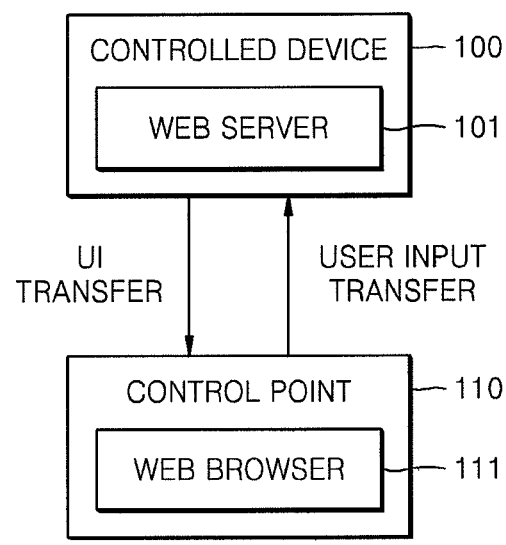
FIG. 1 is a block diagram for explaining a conventional Web-based device control method.
Figure 2:
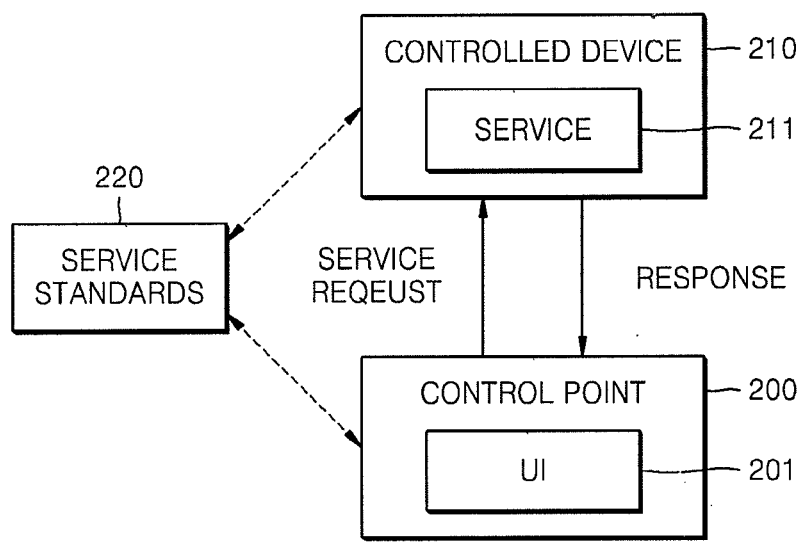
FIG. 2 is a block diagram for explaining a conventional remote procedure call (RPC)-based device control method.
Figure 3:
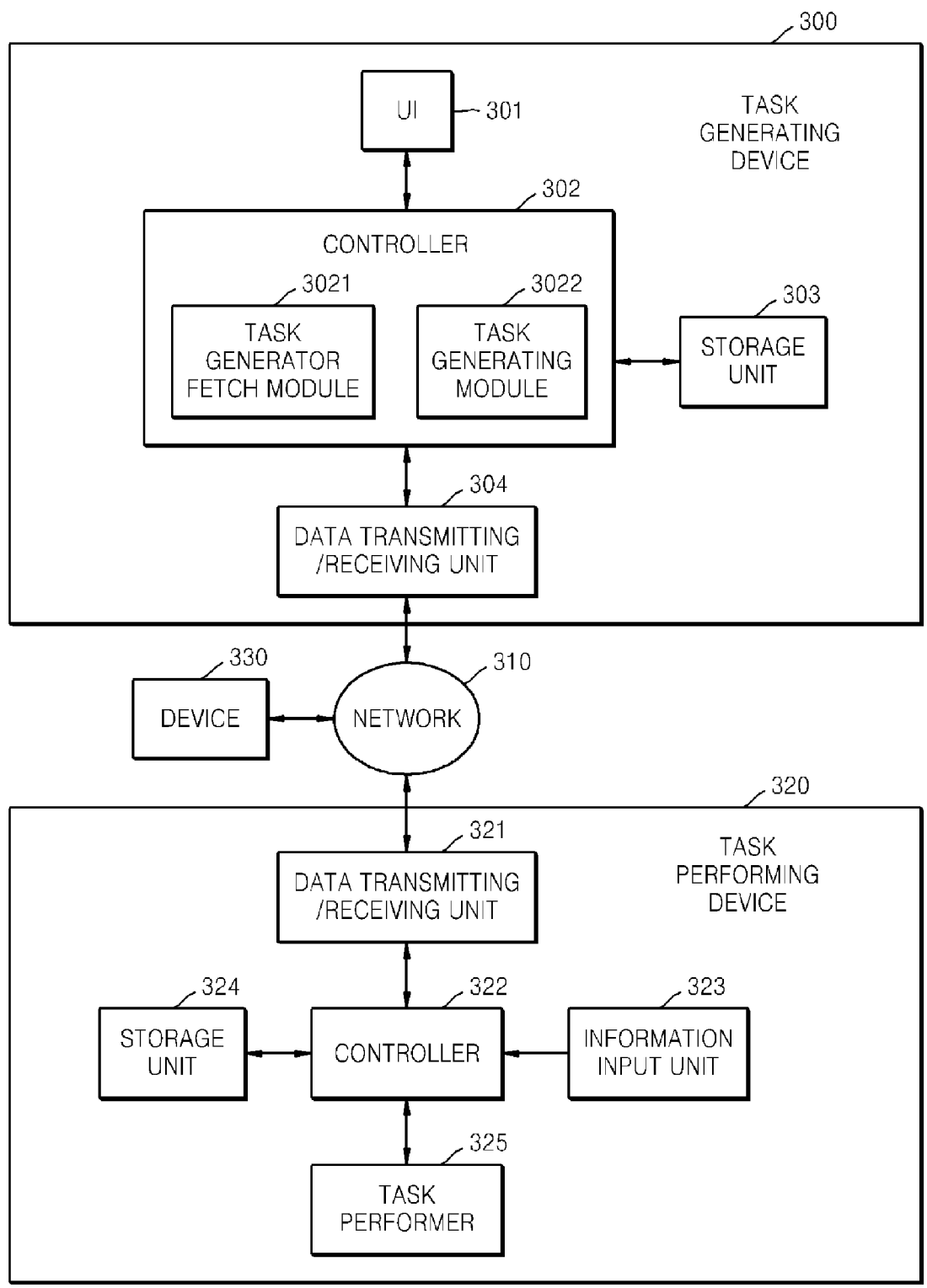
FIG. 3 is a block diagram of a network including a task generating device according to an embodiment of the present invention.

FIG. 3 is a block diagram of a network including a task generating device 300 according to an embodiment of the present invention. Referring to FIG. 3, the network includes a network 310, the task performing device 300, and a device 330.

If a user requests to control the task performing device 320, the task generating device 300 fetches a task generator from the task performing device 320 via the network 310. However, the task generating device 300 can fetch the task generator from the task performing device 320 or the device 330 connected to the network 310 after the task generating device 300 is connected to the network 310 or the task performing device 320 is connected to the network 310. The device 330 can be identical to the task generating device 300 or the task performing device 320, or can generate and perform a task. Also, when the user requests to fetch the task generator or a control menu, the task generating device 300 can fetch the task generator from a storage unit 303 included in the task generating device 300.

If the user selects a service item based on the fetched task generator, the task generating device 300 generates a task based on the task generator and transfers the task to the task performing device 320 via the network 310.

The task generating device 300 includes a user interface (UI) 301, a controller 302, the storage unit 303, and a data transmitter/receiver 304.

The UI 301 interfaces the user and the task generating device 300. In particular, the UI 301 can display the control menu including the service item based on the task generator. The control menu can be a control menu of the task performing device 320.

If the user requests to control the task performing device 320 connected to the network 310, the controller 302 fetches the task generator from the task performing device 320 via the data transmitter/receiver 304, generates the task, and transfers the task to the task performing device 320 via the data transmitter/receiver 304.

The controller 302 includes a task generator fetch module 3021 and a task generating module 3022. If the user requests to control the task performing device 320 via the UI 301, the task generator fetch module 3021 is operated. Then, the service item is selected using the task generator via the UI 301, and the task generating module 3022 is operated. Therefore, the controller 302 generates the task if a service item based on the task generator is selected according to the control menu of the task performing device 320 displayed by the UI 301.

The task generator fetched from the task performing device 320 includes unique identification information, a display message, and task generating regulations of the task generator as illustrated in FIG. 4. FIG. 4 illustrates a task generator fetched from the task performing device 320 according to an embodiment of the present invention. The task generating regulations include information necessary for generating a task of a newly agreed action (e.g., a DVD Eject). The task generator can be described in the form of an XML.

The controller 302 can generate a task as illustrated in FIG. 5. FIG. 5 illustrates a task generated based on the task generator illustrated in FIG. 4.

The task generator fetched from the task performing device 320 is illustrated in FIG. 6. FIG. 6 illustrates a task generator fetched from the task performing device 320 according to another embodiment of the present invention. The task generator includes information necessary for generating a task of an action combining a newly agreed action (encoding action) of the task performing device 320 and another action (store action) based on service standards previously agreed by the task performing device 320 and the task generating device 300.

However, the task generator can include information necessary for generating a task of an action combining at least one newly agreed action, or information necessary for generating a task of an action combining the at least one newly agreed action and at least one action based on the previously agreed service standards, or information necessary for generating a task of an action combining at least one action based on the previously agreed service standards.

The controller 302 can fetch the task generator from the task performing device 320 after the task generating device 300 is connected to the network 310 or the task performing device 320 is connected to the network 310. If the device 330 includes the task generator, the controller 302 can fetch the task generator from the device 330 in the same manner as fetching the task generator from the task performing device 320. The controller 302 can fetch the task generator from the storage unit 303.

If the task performing device 320 is not connected to the network 310 or is not set as an operation state after the task is generated, the task performing device 320 is connected to the network 310 and stores the generated task in the storage unit 303 until the task performing device 320 is set as the operation state. The action included in the task does not include only functions capable of supporting the task performing device 320. For example, the action included in the task can include functions supported by the task performing device 320 and the device 330.

The storage unit 303 stores the task generator that is controlled by the controller 302 and fetched from the task performing device 320 and the task.

The data transmitting/receiving unit 304 transmits/receives data between the controller 302 and the task performing unit 320 or the controller 302 and the device 330 via the network 310.

The network 310 is a home network using UPnP.

The task performing device 320 has a list of the task generator for newly added actions, provides the task generator to the task generating device 300 when requested, and performs a task when receiving the task generated by the task generating device 300. However, the task performing device 320 can provide the task generator to the task generating device 300 after being connected to the network 310.

The task performing device 320 comprises a data transmitting/receiving unit 321, a controller 322, an information input unit 323, a storage unit 324, and a task performer 325 as illustrated in FIG. 3.

The data transmitting/receiving unit 321 transmits/receives data between the controller 322 and the task generating unit 300 via the network 310.

When the data transmitting/receiving unit 321 requests to fetch a task generator, the controller 322 reads the task generator stored in the storage unit 324, and transfer the task generator to the task generating device 300 via the data transmitting/receiving unit 321. However, the controller 322 reads the task generator stored in the storage unit 324 after the task performing unit 320 is connected to the network 310, and transfers the task generator to the task generating device 300 via the data transmitting/receiving unit 321. The controller 322 receives a task from the data transmitting/receiving unit 321 and controls the task performer 325 based on the task.

The storage unit 324 stores the task generator. If at least one new action is added via the information input unit 323, the task generator is generated as illustrated in FIG. 4 or 6 and is stored in the storage unit 324 by the controller 322. However, as defined in the task generating device 300, the task generator can include a combination of at least one new action and at least one previously agreed action, or at least one previously agreed action.

The task performing device 320 can be disconnected from the network 310 or cannot be operated while being connected to the network 310 after transferring the task generator to the task generating device 300. If the task performing device 320 is disconnected from the network 310 or is not operated while being connected to the network 310, the task performing device 320 is connected to the network 310 to be operated, searches for a task from the task generating device 300 according to a task browse or a task search command, and fetches the task.

The task performing device 320 performs the task, updates information on the task, and transmits the updated task to the device 330 since the task is performed by the interworking of the task performing device 320 and the device 330.

The network illustrated in FIG. 3 includes one task generating device 300, one task performing device 320, and one device 330 connected to the network 310. However, the network can include a plurality of the task generating devices as the task generating devices 300 and a plurality of the task performing devices as the task performing devices 320. Therefore, when the plurality of task generating devices and the plurality of task performing devices are connected to the network, task generators are sequentially fetched and transmitted from at least one task generating device or at least one task performing device that is connected to the network 310.

FIG. 7 is a flowchart of a task generating method according to an embodiment of the present invention. Referring to FIG. 7, a first device 700 fetches a task generator from a second device 710.

When a task-based device is controlled in a home network using UPnP, the first device 700 having a UI function among devices connected to the home network is used to fetch the task generator from the second device 710 connected to the home network (Operations 701 and 702).

The task generator is described as an XML illustrated in FIGS. 4 and 6, and includes unique identification information, a display message, and task generating regulations. The task generating regulations include a piece of information necessary for generating a task having at least one newly agreed action, a task having a combination of the at least one newly agreed action and at least one action based on service standards previously agreed by the first device 700 and the second device 710, or a task having the at least one action based on service standards previously agreed by the first device 700 and the second device 710.

The first device 700 is the same as the task generating device 300 illustrated in FIG. 3, and the second device 710 is the same as the task performing device 320 illustrated in FIG. 3.

A control menu including service items based on the task generator is displayed using the UI function (Operation 703). The control menu can be a menu for controlling the second device 710.

If a service item based on the task generator among service items included in the control menu is selected (Operation 704), a task is generated based on the task generator (Operation 705). That is, the task illustrated in FIG. 5 is generated based on the task generator illustrated in FIG. 4.

The first device 700 transfers the task to the second device 710 (Operation 706).

The second device 710 performs the task (Operation 707).

However, the task can include an action performed by a device other than the second device 710. The device is at least one device connected to the home network to which the first device 700 and the second device 710 are connected, and can generate the task like the first device 700. The device can be the first device 700.

If the task includes an action to be performed by the first device 700, the first device 700 performs the task. The first device 700 updates information on the task after performing the task. If the task is terminated, the first device 700 does not transfer the task to the second device 710. However, if it is necessary to transfer the task to the second device 710 after the first device 700 updates the information on the task, the first device 700 transfers the task to the second device 710 as in Operation 706. The task transferred to the second device 710 is an updated task. Since a device to which the task is transferred is determined according to an action included in the updated task or the generated task, the first device 700 can transfer the task to a device connected to the home network other than the second device 710.

Figure 8:
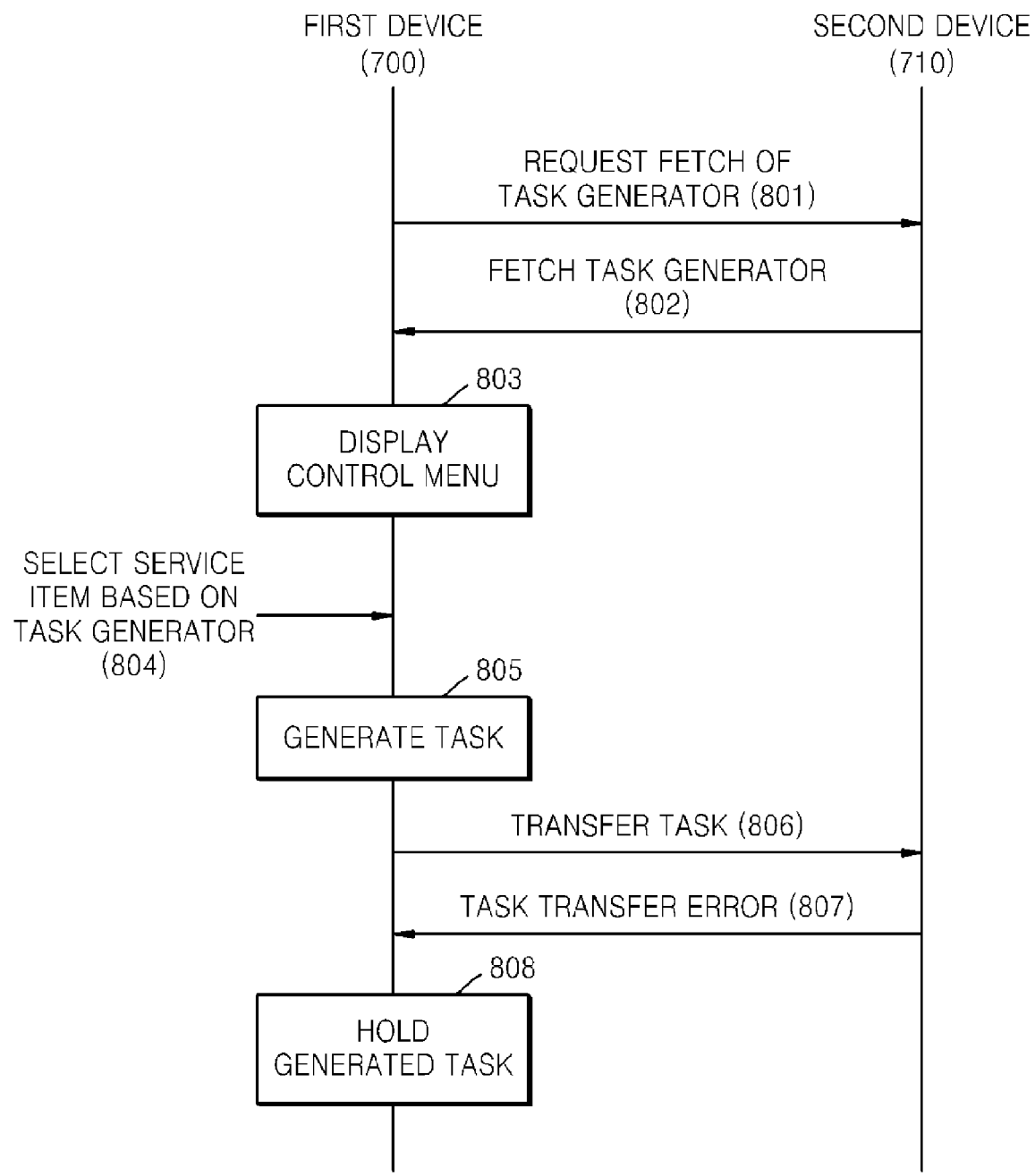
FIG. 8 is a flowchart of a task generating method according to another embodiment of the present invention.

FIG. 8 is a flowchart of a task generating method according to another embodiment of the present invention. Referring to FIG. 8, Operations 810 through 806 are the same as Operations 701 through 706 illustrated in FIG. 7. Therefore, the first device 700 transfers a generated task to the second device 710 (Operation 806).

However, if the second device 710 is disconnected from a network or is not operated while being connected to the network after transferring a task generator, a task transfer error message is transferred to the first device 700 (Operation 807). Therefore, the first device 700 holds the generated task until the second device 710 is connected to the network to be operated (Operation 808). The task held by the first device 700 can be transferred to the second device 710 after the second device is connected to the network to be operated, and fetches the task according to a task browse or search by the second device 710.

The task generator held by the second device 710 can be fetched by the first device 700 after the second device 710 is connected to the network.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed network coupled computer systems so that the computer readable code is stored and executed in a distributed fashion.

While this invention has been particularly shown and described with reference to exemplary embodiments thereof, it will be understood by those skilled in the art that various changes in form and details may be made therein without departing from the spirit and scope of the invention as defined by the appended claims.

The invention claimed is:

1. A method of generating a task in a network including at least one task generating device and at least one task performing device, the method comprising:
fetching a task generator from the at least one task performing device according to a request to control the at least one task performing device via a user interface (UI) of a task generating device among the at least one task generating device, the task generator is based on at least one action of the at least one task performing device;
displaying a control menu via the UI, the control menu including at least one service item based on the fetched task generator;
generating the task by the task generating device based on the fetched task generator corresponding to a service item being selected from the at least one service item included in the control menu, and
transmitting the generated task from the task generating device to the at least one task performing device,
wherein the task generator includes unique identification information, a display message, and task generating regulations,
wherein the task generating regulations include information necessary for generating at least one of a first task, a second task, and a third task,
wherein the first task includes at least one action combining actions of the task performing device based on service standards between the task performing device and the task generating device,
the second task includes at least one action combining the at least one newly action of the task performing device and the at least one action based on the service standards, and
the third task includes at least one action combining newly actions of the task performing device.

2. The method of claim 1, wherein the task generating regulations include information necessary for generating at least one of a first task and a second task,
wherein the first task includes at least one newly action of the task performing device, and
the second task includes at least one action based on service standards between the task performing device and the task generating device.

3. The method of claim 1, further comprising:
transferring the task generated by the task generating device to at least one other device connected to the network; and
when the at least one other device is disconnected from the network or is not operated, holding the task at the task generating device until the at least one other device is connected to the network to be operated.

4. The method of claim 1, further comprising:
transferring the task generated by the task generating device to at least one other device connected to the network; and
when the at least one other device is disconnected from the network or is not operated, holding the task at the task generating device until the at least one other device is connected to the network to be operated.

5. A task generating device in a network including at least one task generating device and at least one task performing device, the apparatus comprising:
a user interface (UI) through which a user can access the apparatus;
a data transmitting and receiving unit which communicates with the at least one task performing device via the network;
a processor which fetches a task generator from the at least one task performing device according to a request to control the at least one task performing device via the UI, the task generator is based on an action the at least one task performing device, displays a control menu via the UI, the control menu including at least service item based on the fetched task generator, generates a task based on the fetched task generator corresponding to a service item being selected from the at least one service item included in the control menu, and transmits the generated task from the apparatus to the at least one task performing device via the data transmitting and receiving unit,
wherein the task generator includes unique identification information, a display message, and task generating regulations,
wherein the task generating regulations include information necessary for generating at least one of a first task, a second task, and a third task,
wherein the first task includes at least one action combining actions of the task performing device based on service standards between the task performing device and the task generating device,
the second task includes at least one action combining the at least one newly action of the task performing device and the at least one action based on the service standards, and
the third task includes at least one action combining newly actions of the task performing device.

6. The device of claim 5, wherein the task generating regulations include information necessary for generating at least one of a first task and a second task,
wherein the first task includes at least one newly action of the task performing device, and
the second task includes at least one action based on service standards between the task generating device and the task performing device.

7. The device of claim 5, wherein when the task performing device is disconnected from the network or is not operated after the processor generates the task, the processor stores and holds the task in the storage unit until the task performing device is connected to the network to be operated.

8. A non-transitory computer readable recording medium having embodied thereon a computer program for executing a method of generating a task in a network including at least one task generating device and at least one task performing device, the method comprising:

fetching a task generator from the at least one task performing device according to a request to control the at least one task performing device via a user interface (UI) of a task generating device among at least one task generating device the task generator is based on at least action of the at least one task performing device;

displaying a control menu via the UI, the control menu including at least one service item based on the fetched task generator; and generating the task by the task generating device based on the fetched task generator corresponding to a service item being selected from the at least one service item included in the control menu, and transmitting the generated task from the task generating device to the at least one task performing device, wherein the task generator includes unique identification information, a display message, and task generating regulations, wherein the task generating regulations include information necessary for generating at least one of a first task, a second task, and a third task, wherein the first task includes at least one action combining actions of the task performing device based on service standards between the task performing device and the task generating device, the second task includes at least one action combining the at least one newly action of the task performing device and the at least one action based on the service standards, and the third task includes at least one action combining newly actions of the task performing device.

9. The method of claim 1, further comprising:

receiving a task transfer error message from the at least one task performing device after transferring the task generated by the task generating device to the at least one task performing device; and holding the task at the task generating device until the at least one task performing device is connected to the network to be operated.

10. The device of claim 5, wherein the processor holds the generated task until the at least one task performing device is connected to the network to be operated, when the processor receives a task transfer error message from the at least one task performing device after transferring the generated task to the at least one task performing device.

11. The device of claim 5, wherein the processor further includes a function of transferring the generated task to at least one other device connected to the network, and holding the generated task until the at least one other device is connected to the network to be operated when the at least one other device is disconnected from the network or is not operated.

* * * * *